US008441950B2

(12) United States Patent
Sachs

(10) Patent No.: US 8,441,950 B2
(45) Date of Patent: May 14, 2013

(54) METHOD AND SYSTEM FOR INTER-SYSTEM INTERFERENCE BASED RADIO CONTROL

(75) Inventor: Joachim Sachs, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 269 days.

(21) Appl. No.: 12/601,252

(22) PCT Filed: May 20, 2008

(86) PCT No.: PCT/IB2008/001252
§ 371 (c)(1),
(2), (4) Date: Nov. 20, 2009

(87) PCT Pub. No.: WO2008/142529
PCT Pub. Date: Nov. 27, 2008

(65) Prior Publication Data
US 2010/0172254 A1  Jul. 8, 2010

Related U.S. Application Data

(60) Provisional application No. 60/939,410, filed on May 22, 2007.

(51) Int. Cl.
*G01R 31/08* (2006.01)
(52) U.S. Cl.
USPC ........ 370/252; 370/445; 370/310; 455/552.1; 455/557; 455/41.2

(58) Field of Classification Search ....................... None
See application file for complete search history.

(56) References Cited

U.S. PATENT DOCUMENTS

| 6,934,558 | B1 | 8/2005 | Sainton et al. |
| 6,950,675 | B2 * | 9/2005 | Wilhelm .................... 455/552.1 |
| 7,117,008 | B2 | 10/2006 | Bajikar |
| 7,146,133 | B2 * | 12/2006 | Bahl et al. ..................... 455/63.1 |
| 7,280,811 | B2 * | 10/2007 | Sugiyama et al. .......... 455/168.1 |
| 2003/0134637 | A1 * | 7/2003 | Cooper ......................... 455/432 |
| 2005/0255878 | A1 * | 11/2005 | Leinonen et al. .......... 455/552.1 |
| 2005/0277416 | A1 * | 12/2005 | Tolli et al. ..................... 455/436 |
| 2008/0062919 | A1 * | 3/2008 | Chen et al. .................... 370/329 |

FOREIGN PATENT DOCUMENTS

| EP | 1 489 788 A | 12/2004 |
| WO | WO 03/067918 A | 8/2003 |

* cited by examiner

*Primary Examiner* — Kibrom T Hailu

(57) ABSTRACT

User-networks having more than one type of access system are connected to networks having multi-access technology. Interference is measured between the connected, active access systems and the active systems are prioritized. A priority value is assigned to each of the active access systems based on the interference between systems. According to the assigned priority value, the access system with the highest value is enabled. Remaining systems are then compared with the enabled access system and an interference threshold. If the level of interference exceeds the threshold, the offending access system is disabled. If the threshold is not exceeded, the number of simultaneously operating access systems is compared to a predetermined number and the access systems below that number are then disabled.

19 Claims, 3 Drawing Sheets

METHOD AND SYSTEM FOR INTER-SYSTEM INTERFERENCE BASED RADIO CONTROL

CROSS-REFERENCE TO RELATED APPLICATIONS

This application claims the benefit of U.S. Provisional Application No. 60/939,410, filed May 22, 2007, the disclosure of which is incorporated herein by reference.

TECHNICAL FIELD

The present invention relates to wireless access technologies. More particularly, and not by way of limitation, the present invention is directed to a system and method for accessing networks having multiple access means.

BACKGROUND

Networks that include a number of access technologies means that a user device or a user-network—which comprises a number of devices, such as a laptop with a WLAN access card and Bluetooth or an inter-connected personal area network—can connect via one or more radio access technologies to a peer node. These access technologies can be provided by a single network operator, or alternatively by a number of network operators. Examples, are the 3GPP mobile networks that provide mechanisms and reference points for integrating a number of access technologies (GSM, (E)GPRS, enhanced EDGE, UMTS, HSPA, evolved HSPA, LTE, WLAN, WiMAX, and others).

Within a multi-access system as described above, there is a problem caused by frequency interference between different radio technologies. In particular, within an end system (user device or user-network), there can be substantial interference between radio transceivers of different access technologies.

To some extent this problem has been addressed in order to coordinate the usage of WLAN and Bluetooth in wireless devices. Since both WLAN and Bluetooth networks operate in the same frequency band, the coordinated use (e.g. time shared usage of WLAN and Bluetooth) can reduce interference. However, a first requirement is to determine which access interferes with what other access. In case of WLAN and Bluetooth the mutual interference is already known due to the fixed allocation of both access technologies to the same frequency band. In the future, this a-priori knowledge about the inter-interference between different access technologies cannot be assumed.

Radio access technologies are increasingly decoupled from frequency bands (i.e., technology-neutral frequency allocation). While GSM and UMTS today have fixed frequency allocations, LTE and WiMAX are standardized to be applicable in any frequency band of different bandwidths. Also a re-use of 2G frequency bands or TV frequency bands for any 3G/4G technologies is being considered. In the context of cognitive radio (as, for example, standardized in IEEE 802.22 or IEEE P1900) a flexible allocation of a radio technology in any frequency band is being investigated. It can be expected that sooner or later many access technologies can be used in several different frequency bands.

User-networks or user devices use an increasing number of radio transceivers. Such radio transceivers utilize, for example, Bluetooth, WLAN, GSM/EGPRS, UMTS/HSPA, LTE, WiMAX, ZigBee, DVB-H/M, DAB, etc. Note that it is not required that every access technology have a dedicated modem. It can also be that the user-network has a number of configurable modems (software-defined or software-reconfigurable radio) that can be configured for different access technologies.

Users become increasingly independent from network providers, e.g. by having multiple subscriptions or more dynamic agreements with access providers, or by regulatory open access schemes that require an operator to provide service to any user. As a result, they can connect to different access providers providing different types of access in different frequency bands. In this multi-actor scenario, a single access provider is not automatically coordinating the inter-system interference by according frequency spacing. Instead, it can be that two access providers provide access (based on the same or different technologies) in close frequency bands, such that the simultaneous usage of the two access systems causes interference between the access systems in the user-network.

U.S. Pat. No. 7,117,008 addresses the problem of cross interference among multiple radio frequency devices in a wireless communication-enabled computer system. Mitigating cross interference is purportedly accomplished by selectively blocking a particular signal. Priority is assigned to each active transceiver and based on priority and pending transactions, control of the communications is arbitrated between active wireless transceivers.

SUMMARY

In one aspect, the present invention provides a method of controlling access to a network. A user-network that comprises more than one network access system, e.g., EDGE, WiMax, WLAN, etc., determines the access systems that are available to the user-network (a user-network is a plurality of network access systems and may include a laptop and cell phone, for instance). The amount of interference between the access systems is determined and a predetermined priority value is also determined. The priority value, in conjunction with the amount of interference between the available access systems, is used to determine which access system to enable.

In another aspect the present invention provides a user-network for accessing the network. The User network comprises a plurality of access systems for connecting to the network. Scanning means are coupled with the user-network for scanning different frequency bands to determine available network access systems that are compatible with the plurality of the access systems in the user-network. A list of the user-network's access systems that are compatible with the available network access systems is stored in a memory. The invention includes means for determining an interference level used to help prioritize and rank the active access systems according to interference level and means for enabling the active access system with the lowest interference level.

In yet another aspect, the present invention provides a system for providing access to a network. The system includes; a user-network that has a plurality of access systems that each have different Radio Access Technologies; means for initiating connection of the user-network to the network; means for checking a list of acceptable access systems stored in the network; scanning means coupled with the user-network for scanning different frequency bands to determine available network access systems that are compatible with the plurality of access systems of the user-network; correlation means for correlating the network list of acceptable access systems with the access systems in the user-network; means for determining the amount of interference between the access systems; prioritizing means for assigning a priority value to each of the active access systems according to the interference; and means for enabling the access system that has the highest priority value.

Additional aspects of the invention will be set forth, in part in the detailed description, figures and any claims which follow, and in part will be derived from the detailed description or can be learned by practice of the invention. It is to be understood that both the foregoing general description and the followed detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Figure 1A:
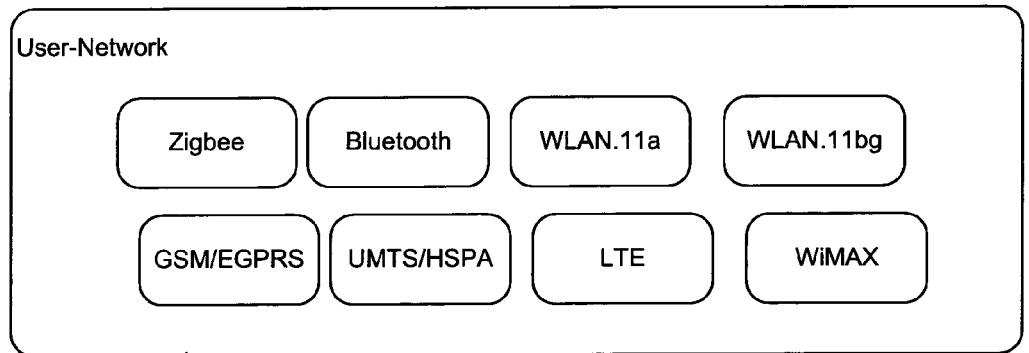
FIG. 1a depicts a multi-radio network (user terminal) with multiple radio modules that can be used in different frequency bands and transmission nodes.

FIG. 1a depicts a multi-radio network (user terminal) with multiple radio modules that can be used in different frequency bands and transmission nodes (e.g., TDD, FDD). The user-network setting assumes a multi-radio user-network contains multiple radio modems. Each of the radio modems can be active at the same time. They may also be configurable to different frequency bands or bandwidths for different radio access technologies.

It is desired, that the interference between different access systems be avoided. In particular, the problem addressed here is inter-system interference caused at a user-network due to the activity of multiple radio modems in close proximity operating in similar frequency bands. A "user-network" comprises more than one access system and can be a multi-access device such as a smart phone, a laptop with multiple modem devices or a number of different devices that form a local network (phone/laptop/camera, each providing different access technologies but each provides access for the whole local network). An access system is a radio access technology that can be for instance; WLAN, WiMAX, LTE (can also include release/version numbers such as 802.11a, 802.11g, LTE Release 9) and have a particular channel bandwidth, e.g., 5, 10, 20 MHz—some access systems (AS) can support different bandwidths and some only have a fixed bandwidth, a fact that is known if the AS type is known.

At least some access technologies can operate in different frequency bands, for example: 3G Long Term Evolution (or Evolved UTRAN), as well as WiMAX and IEEE 802.20 can operate in licensed and unlicensed frequency bands, e.g. the 450, 700, 800, 900, 1800, 1900, 2000, 2100, 2200, 2400, 2500, 3500, 5000 MHz frequency bands. Further access technologies like 802.15, 802.11, ZigBee can operate in unlicensed frequency bands.

Figure 1B:
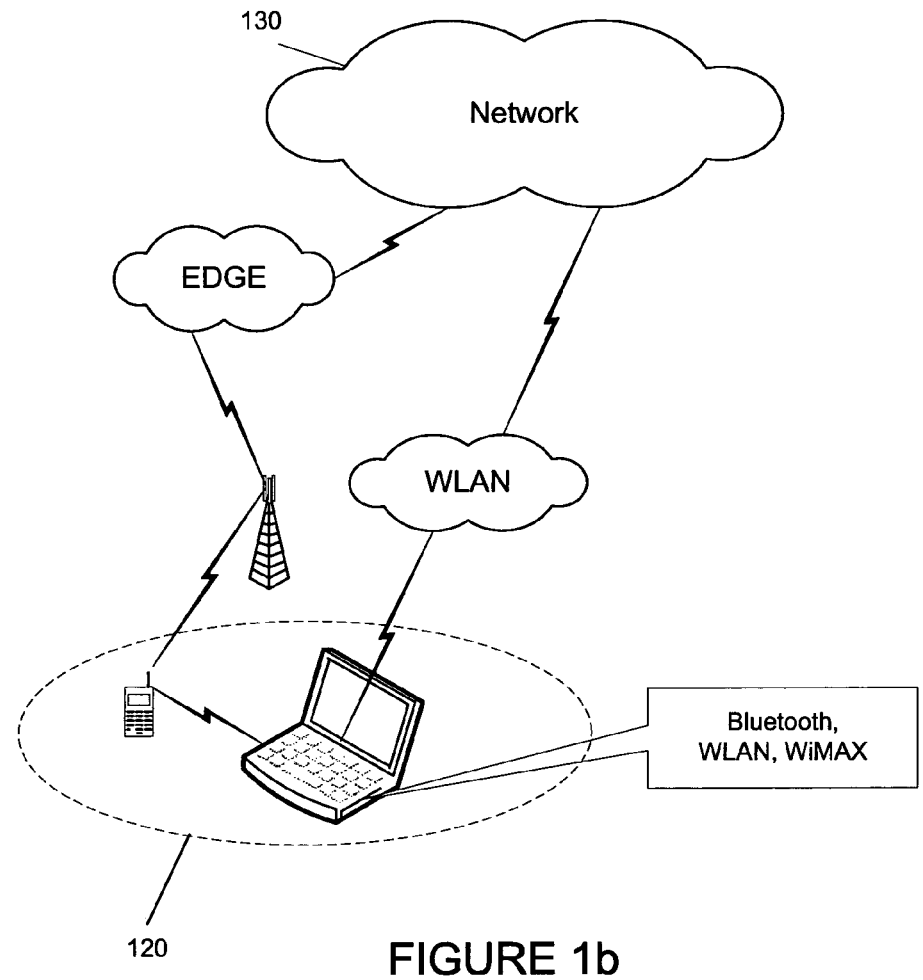
FIG. 1b depicts a high level block diagram of a user-network in communication with a multi-access network according to an embodiment of the present invention.
Figure 2:
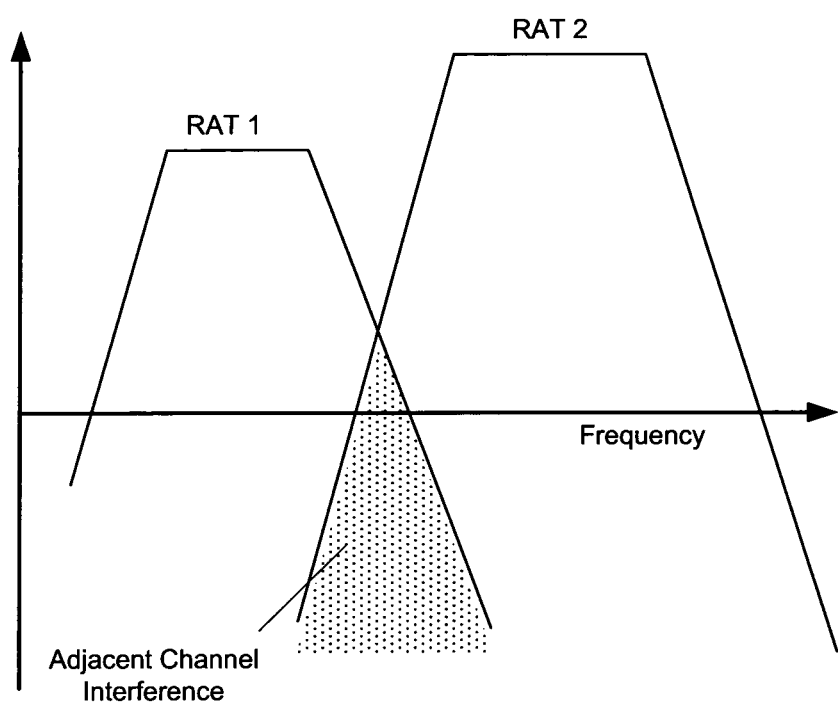
FIG. 2 illustrates a graph of the determination of inter-system interference as Adjacent Channel Interference.

FIG. 1b is a high level block diagram of a user-network having more than one access system, or radio access technology, in communication with a network allowing access through more than one access system in accordance with an embodiment of the present invention. The user-network 120 includes laptop computer 122 that can connect to cellphone 124 to connect to Network 130 via EDGE access connection 126. Laptop 120 can also connect to Network 130 via a wireless connection with Wireless Local Area Network 128. Laptop 120 has stored the types of access technologies that are available to Laptop 120 (e.g., Bluetooth, WLAN). Network 130 has stored the list of compatible access technologies that are available for connecting to Network 130. It is well known that Bluetooth and WLAN are access technologies that interfere with each other. Use of FIG. 2 illustrates a graph of the determination of inter-system interference as Adjacent Channel Interference. The graph determines the interference between the radio access channels AS1 and AS2 that are providing access to access systems that utilize the Radio Access Technologies in AS1 and AS2. The inter-system interference is shown in the shaded portion of the graph and designated Adjacent Channel Interference. The curves AS 1 and AS 2 describe the profile of frequency filters (band-pass filters). The amount of interference between access systems that are represented by AS 1 and AS2, depends on the quality of the filters; e.g. a better and more expensive filter has a steeper flank, thus decreasing interference. In order to understand the cross interference, it is required to know filter characteristics of both Radio Access Technologies, the power level of AS 2 and the sensitivity level to interference of AS 1, for example. Not all these parameters may be known for cross-interference determination, so standard parameters (of filter quality and power level) can be assumed.

As a result of the interference, one of the access systems in AS1 or AS2, may be disabled or the existing priority of each access system is reconsidered and one may be lowered. For instance, an access system priority list may include number 1. LTE (3500 MHz); number 2 WiMAX (3500 MHz); number 3. HSPA (2000 MHz), number 4. WLAN (2400 MHz) and number 5. Zigbee (2400 MHz). In this case, number 2 on the list interferes with number 2 WiMax and number 5, Zigbee interferes with number 4 WLAN. The following accesses are disabled as they interfere with higher priority access systems: number 2. WiMAX and number 5. Zigbee. The priority list now becomes number 1. LTE, number 3. HSPA and number 4. WLAN.

According to the present invention, a cross reference metric (e.g., table 1) is determined and the results are compared with a threshold. In the case of reconsidering the priority of each system, interfering access systems are down prioritized so that the priority list becomes: 1. LTE (3500 MHz), 2. HSPA (2000 MHZ), 3. WLAN (2400 MHz) 4. WiMAX (3500 MHz) and 5. Zigbee (2400 MHz). Another means of prioritizing may be the use of a "utility value" that can be expressed as a real number and the priority is determined by descending order of the utility values.

Figure 3:
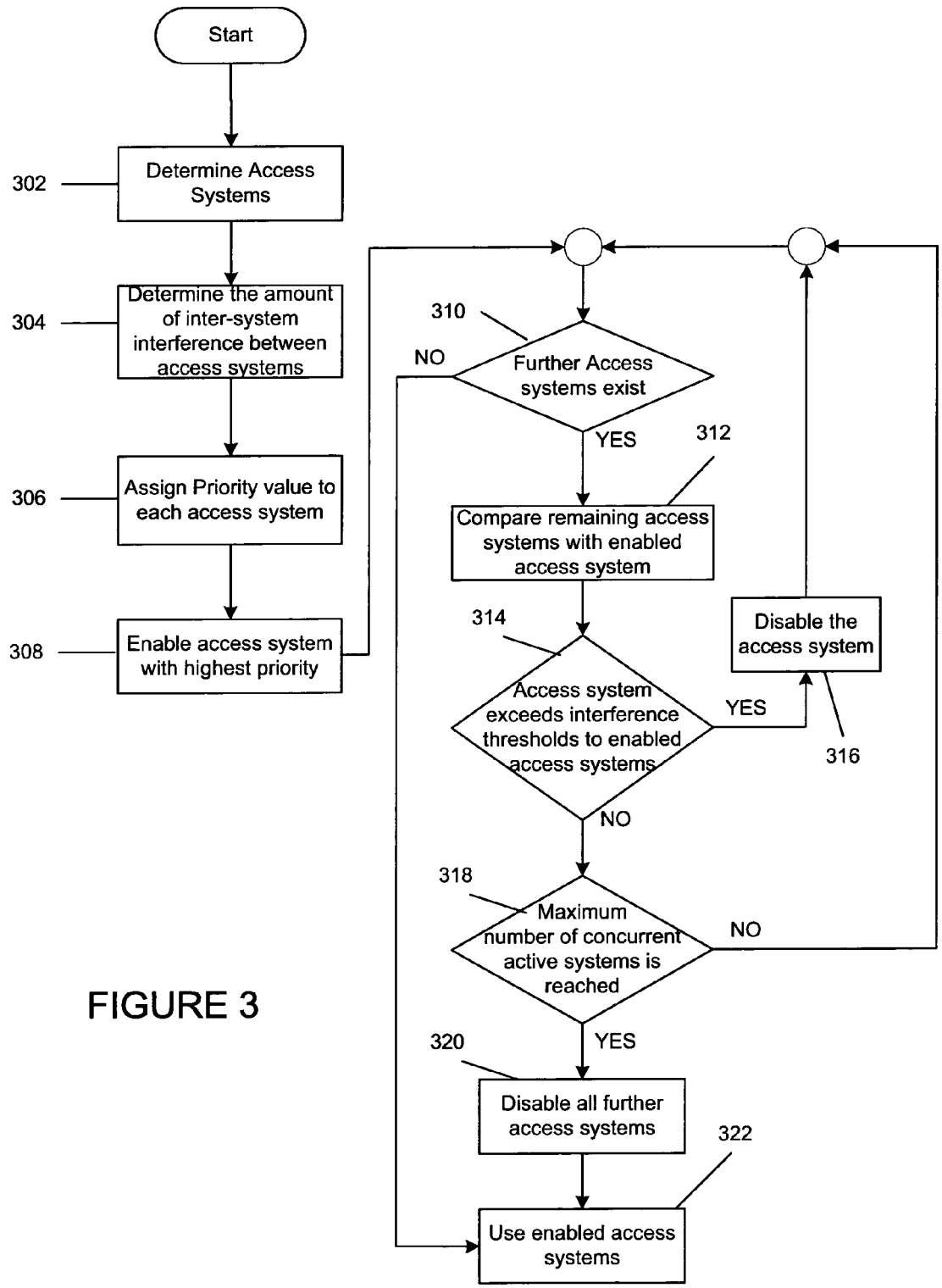
FIG. 3 depicts a high level block diagram of a process for reducing the amount of inter-system interference in a multi-access network according to an embodiment of the present invention.

FIG. 3 depicts a high level block diagram of a process for reducing the amount of inter-system interference in a multi-access network according to an embodiment of the present invention. The process begins compiling and storing, or making available to the user-network and the multi-access network a list of possible access technologies for a user-network (step 302) (e.g., laptop—external modem combination). This list of possible access technologies can be determined by the user-network, e.g. by scanning over different frequency bands. It can also be determined from a locally stored list of available access systems, e.g. depending on the user-network location. The list of the available access systems can also be stored in the network, from where it can be advertised to the user-network, or from where the user-network can query this information. Also a combination of these options is possible. For example, the network can advertise a list of access systems, and the terminal validates this list by scanning for the advertised access systems.

Once a list of possible access systems is known and the user-network desires to connect to the network, it is determined what amount of inter-system interference the simultaneous usage of multiple access technologies is causing (step 304). Interference is determined in ways well known to those skilled in the art. In accordance with the present invention, determination of interference between Radio Access Technologies makes use of a matrix such as that shown in Table 1, where Int(ASx=>ASy) denotes the amount of interference caused by the usage of ASx on the simultaneous usage of ASy. This inter-system interference matrix can be determined independently for uplink and downlink transmission.

TABLE 1

Access System matrix for determining interference

|     | AS1 | AS2 | AS3 | AS4 |
| --- | --- | --- | --- | --- |
| AS1 | — | Int(AS2 => AS1) | Int(AS3 => AS1) | Int(AS4 => AS1) |
| AS2 | Int(AS1 => AS2) | — | Int(AS3 => AS2) | Int(AS4 => AS2) |
| AS3 | Int(AS1 => AS3) | Int(AS2 => AS3) | — | Int(AS4 => AS3) |
| AS4 | Int(AS1 => AS4) | Int(AS2 => AS4) | Int(AS3 => AS4) | — |

The inter-system interference between different access technologies can depend on two aspects:
  Radio interference of the radio transmission of the different access systems and
  cross-talk within the user-network device implementation, e.g. due to interference between two antennas in the same device. This is a device specific factor. For instance, it is known that WLAN and Bluetooth interfere and it has been proposed to coordinate the access. However the present invention does not require a determination of the cross interference level for WLAN and Bluetooth as that is already known and systems are hard coded to account for the interference.

Radio interference is determined according to known procedures to determine adjacent channel interference and to populate Table 1. Inter-system interference is determined based on the following:
  center frequency of the access system and carrier bandwidth of the interfering access system;
  transmit filter quality and characteristics of the transmitter of the interfering access system;
  transmit power of the transmitter of the interfering access system;
  path loss between transmitter of the interfering access system and the receiver of the interfered access system;
  transmission activity of the interfering access system (which can depend on the signaling used in the access system);
  center frequency of the access system and bandwidth of the interfered access system;
  transmit power of the transmitter of the interfered access system;
  path loss between transmitter and receiver of the interfered access system; and
  sensitivity of the receiver of the interfered access system and the required signal-to-interference ratio.

From the above parameters, interference caused by the interfering access system on the interfered access system can be determined, as well as the ratio of the signal power of the interfered access system to the interference caused by the interfering access system.

Some of the parameters depend on the characteristics and configuration of the access system. For example, some access systems can be used for different carrier bandwidths (e.g. EUTRAN and WiMAX). Further, access systems can use time-division duplex (TDD) or frequency division duplex (FDD). In a TDD scheme, the transmitter in the interfering frequency band is temporarily located very close to the receiver of the interfered access system, which results in a very small path loss and large interference.

The inter-system interference can be determined in the user-network or it can be determined in the network. Further, it may not always be possible to determine all of the above parameters exactly. In this case pre-determined typical values for the parameters can be used.

Once the amount of inter-system interference is determined, the process proceeds to step 306, where a priority value is determined and assigned for the access systems of a user-network. For example, such a priority list could be ranked: LTE(900)>LTE(2500)>WiMAX (2500)>WIMAX (3500)>Bluetooth(2400)>WLAN(2400)>WLAN(5200), where the parenthesis indicate the frequency band in MHz. This particular example prioritizes LTE in the wide-area 900 MHz band over the LTE 2500 MHz band. Within 2500 MHz, LTE is prioritized over WiMAX, which has priority over WLAN (first 2400 MHz then 5200 MHz). However when a Bluetooth device is active, Bluetooth has higher priority than WLAN.

The priority can be dynamically adapted, and can depend on the services that are running. The priority can be the outcome of an access selection algorithm, which determines utilities for different ASs. The priority can be determined either in the user-network or the access network.

After the priority value is assigned the process moves to step 308, where the access system with the highest priority is enabled. Next, the process moves to step 310 to determine if there are anymore access systems available. If not, the process proceeds to step 322 and the enabled access systems are put into service. If more access systems are available the process then executes step 312, where the remaining active access systems are compared with the enabled system. Access systems with lower priority are disabled if the inter-system interference values of these access systems are higher than a certain interference threshold. There can be different interference thresholds for uplink and downlink in an access system and if either of the interference thresholds of an access system is exceeded the lower priority access system is disabled.

If the remaining access systems exceed interference thresholds to enabled access systems, the process goes to step 316 where the remaining access systems that exceed interference thresholds are disabled (the remaining systems would interfere with the enabled system(s)). If the remaining access systems do not exceed the interference thresholds, the process proceeds to step 318.

In step 318, a determination is made whether a predetermined number of concurrent active systems has been reached. The remaining access systems are compared to the enabled system(s) and if the maximum has not been reached the process returns to step 310 to determine if there are more access systems. This process (steps 310 through 318) is iteratively continued until either all access systems have been evaluated or until a maximum number of simultaneously active access systems has been reached.

Returning to step 318, if the maximum number of concurrently active systems is reached, the process then moves to step 320 and all the remaining access systems not selected are disabled. The process proceeds to step 322, where the enabled access systems are then put into use.

The access systems in the user-network and the network are selected and the radio transceivers are disabled so that inter-system interference is minimized. The most favorable Access System is chosen and if another Access System, though less favorable but providing minimal interference, a second Access System may be chosen. All Access Systems that are causing interference above specified thresholds are disabled. A result of the interference is that one of the access systems is disabled or the existing priority is lowered.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

The invention claimed is:

1. A method of controlling access to a network, the method comprising:
    initiating connection of a user-network to the network, the user-network comprising more than one access system;
    determining access systems available to the user-network for accessing the network;
    determining a priority value of each of the available access systems;
    determining a priority access system from the available access systems for accessing the network and enabling the priority access system;
    determining an amount of interference between further of the available access systems and the priority access system using the results of a matrix comprising:

|  | AS1 | AS2 | AS3 | AS4 |
|---|---|---|---|---|
| AS1 | — | Int(AS2 => AS1) | Int(AS3 => AS1) | Int(AS4 => AS1) |
| AS2 | Int(AS1 => AS2) | — | Int(AS3 => AS2) | Int(AS4 => AS2) |
| AS3 | Int(AS1 => AS3) | Int(AS2 => AS3) | — | Int(AS4 => AS3) |
| AS4 | Int(AS1 => AS4) | Int(AS2 => AS4) | Int(AS3 => AS4) | — | where the relationship Int(ASx=>ASy) denotes the amount of interference caused by using ASx simultaneously during the usage of ASy, where AS, which represents an access system, is an acronym for Access System and x and y are numbers corresponding to individual access systems available to the user-network; and
   responsive to the determined amount of interference, enabling the further access system having the highest priority value.

2. The method of claim 1, further comprising:
   comparing the enabled access system to remaining, available access systems;
   determining whether each remaining, available access system exceeds a predetermined interference threshold; and
   either disabling or down prioritizing the remaining, available access systems that exceed the predetermined interference threshold.

3. The method of claim 1, further comprising
   scanning different frequency bands to determine available network access systems that are compatible with access systems of the user-network.

4. The method of claim 1, wherein determining whether each remaining access system exceeds a predetermined interference threshold further comprises
   determining whether a predetermined maximum number of simultaneously operating access systems has been reached and
   continuing to monitor the access systems or
   connecting the enabled access systems to the user-network.

5. The method of claim 1, wherein the relationship Int (ASx=>ASy) can be a normalized interference value or an absolute interference value.

6. The method of claim 1, the step of assigning a priority value to each of the active access systems further comprising, assigning the priority value according to the level of interference, wherein the lowest priority number indicates the access system having the lowest interference with any of the other active access systems.

7. The method of claim 6, further comprising the step of disabling, according to priority, any access system above the predetermined maximum number of active access systems.

8. The method of claim 1, wherein the network advertises a list of access systems and the user-network validates the list by scanning and comparing signal quality with a predetermined signal quality threshold.

9. A user-network for accessing a network, the user-network comprising:
    a plurality of access systems for connecting to the network;
    a memory for storing a list of the user-network's access systems that are compatible with the available network access systems; and
    a microprocessor coupled with a persistent memory storing instructions that when executed by the microprocessor cause the user-network to:

scan different frequency bands to determine available network access systems that are compatible with the plurality of access systems of the user-network;

compare the scanned list of active user-network access systems to the plurality of access systems of the user-network;

determine a priority access system from the available access systems for accessing the network and enabling the priority access system;

determine a level of interference between further of the active access systems and the priority access system;

determine the level of interference between the active access systems comprising using the results of a matrix comprising:

|  | AS1 | AS2 | AS3 | AS4 |
|---|---|---|---|---|
| AS1 | — | Int(AS2 => AS1) | Int(AS3 => AS1) | Int(AS4 => AS1) |
| AS2 | Int(AS1 => AS2) | — | Int(AS3 => AS2) | Int(AS4 => AS2) |
| AS3 | Int(AS1 => AS3) | Int(AS2 => AS3) | — | Int(AS4 => AS3) |
| AS4 | Int(AS1 => AS4) | Int(AS2 => AS4) | Int(AS3 => AS4) | — | where the relationship Int(ASx=>ASy) denotes the amount of interference caused by using ASx simultaneously during the usage of ASy, where AS, which represents an access system, is an acronym for Access System and x and y are numbers corresponding to individual access systems available to the user-network;

prioritize the measured interference levels and ranking the active access systems according to interference level;

assign a priority value to each of the active access systems; and enable the priority access system and the further active access system with the lowest interference level.

10. The user-network of claim 9, further comprising the microprocessor executing further instructions to:

determine whether a predetermined maximum number of simultaneously operating access systems has been reached, and monitor the access systems or means for connecting the enabled access systems to the user-network.

11. The user-network of claim 9, the instructions to assign a priority value to each of the active access systems further comprising, the microprocessor executing further instructions to assign the priority value according to the level of interference, wherein the lowest priority number indicates the access system having the lowest interference with any of the other active access systems.

12. The user-network of claim 11, further comprising the microprocessor executing further instructions to disable, according to priority, any access system above the predetermined maximum number of active access systems.

13. The user-network of claim 9, further comprising a receiver for receiving network advertisements including a list of access systems, the user-network then validating the list of access systems by scanning frequencies and comparing signal quality with a predetermined signal quality threshold.

14. A system for providing access to a network, the system comprising:

a user-network having a plurality of access systems that have different Radio Access Technologies and a microprocessor and a persistent memory storing instructions that when executed by the microprocessor cause the user-network to:

initiate connection of the user-network to the network;

check a list of acceptable access systems stored in the network;

scan different frequency bands to determine available network access systems that are compatible with the plurality of access systems of the user-network;

correlate the network list of acceptable access systems with the available access systems in the user-network;

determine a priority access system from the available access systems for accessing the network and enabling the priority access system;

determine an amount of interference between the access systems;

determine the amount of interference between the active access systems comprising using the results of a matrix comprising:

|  | AS1 | AS2 | AS3 | AS4 |
|---|---|---|---|---|
| AS1 | — | Int(AS2 => AS1) | Int(AS3 => AS1) | Int(AS4 => AS1) |
| AS2 | Int(AS1 => AS2) | — | Int(AS3 => AS2) | Int(AS4 => AS2) |
| AS3 | Int(AS1 => AS3) | Int(AS2 => AS3) | — | Int(AS4 => AS3) |
| AS4 | Int(AS1 => AS4) | Int(AS2 => AS4) | Int(AS3 => AS4) | — | where the relationship Int(ASx=>ASy) denotes the amount of interference caused by using ASx simultaneously during the usage of ASy, where AS, which represents an access system, is an acronym for Access System and x and y are numbers corresponding to individual access systems available to the user-network assign a priority value to each of the active access systems according to the determined amount of interference; and enable the priority access system and a further access system that has the highest priority value.

15. The system of claim 14, the microprocessor executing further instructions to:

compare the enabled access system to remaining active access systems;

determine whether each remaining access system exceeds a predetermined interference threshold and disable or down prioritize the remaining access systems exceeding the predetermined interference threshold.

16. The system of claim 14, the microprocessor executing further instructions to:
- determine whether a predetermined maximum number of simultaneously operating access systems has been reached, and
- to continue to monitor the access systems or means for connecting the enabled access systems to the user-network.

17. The system of claim 15, the instructions to assign a priority value to each of the active access systems further comprising, instructions to assign the priority value according to the level of interference, wherein the lowest priority number indicates the access system having the lowest interference with any of the other active access systems.

18. The system claim 15, further comprising instructions to disable, according to priority, any access system above the predetermined maximum number of active access systems.

19. The system of claim 15, further comprising a receiver for receiving network advertisements including a list of access systems, the user-network then validating the list of access systems by scanning frequencies and comparing signal quality with a predetermined signal quality threshold.

* * * * *